United States Patent

Beyda et al.

Patent Number: 5,898,768
Date of Patent: Apr. 27, 1999

[54] METHOD AND APPARATUS FOR PROCESSING A SEQUENCE OF CALLS

[75] Inventors: William Joseph Beyda, Cupertino; Shmuel Shaffer, Palo Alto, both of Calif.

[73] Assignee: Siemens Information and Communication Networks, Inc., Boca Raton, Fla.

[21] Appl. No.: 08/770,310

[22] Filed: Dec. 20, 1996

[51] Int. Cl.⁶ .................................................. H04M 3/42
[52] U.S. Cl. ........................ 379/220; 379/115; 379/201; 379/211; 379/229
[58] Field of Search ..................................... 379/111, 112, 379/113, 114, 115, 127, 139, 219, 220, 221, 201, 229, 230, 211

[56] References Cited

U.S. PATENT DOCUMENTS

| | | | |
|---|---|---|---|
| 4,926,462 | 5/1990 | Ladd et al. | 379/67 |
| 5,123,112 | 6/1992 | Choate | 455/56.1 |
| 5,369,699 | 11/1994 | Page et al. | 379/112 |
| 5,459,779 | 10/1995 | Backaus et al. | 379/201 |
| 5,553,135 | 9/1996 | Xing | 379/399 |
| 5,568,484 | 10/1996 | Margis | 370/85.5 |
| 5,568,541 | 10/1996 | Greene | 379/114 |
| 5,570,417 | 10/1996 | Byers | 379/114 |
| 5,592,539 | 1/1997 | Amarant et al. | 379/114 |
| 5,742,905 | 4/1998 | Pepe et al. | 379/210 |
| 5,745,556 | 4/1998 | Ronen | 379/112 |
| 5,764,741 | 6/1998 | Barak | 379/114 |

*Primary Examiner*—Scott Wolinsky

[57] ABSTRACT

A method and apparatus for processing a sequence of calls directed to different destination sites from a single calling site via a provider having a connection-based tariff structure that employs first and second levels of connections in order to increase cost efficiency. The first level connection is from the provider to an intermediate site, such as a server, with the first level connection being maintained throughout the sequence of calls. The second level connection is formed from the intermediate site to the destination sites in the sequential order determined by the calling party. Each call to a destination site includes a different second level connection that is terminated from a completion of the call, without affecting the first level connection. The call information relating to the different calls in the sequence is transmitted from the calling site to the intermediate site by techniques such as the transmission of DTMF signals or conventional digital call setup signals. In one embodiment, the provider is an exchange carrier of air-to-ground telecommunications capability.

19 Claims, 3 Drawing Sheets

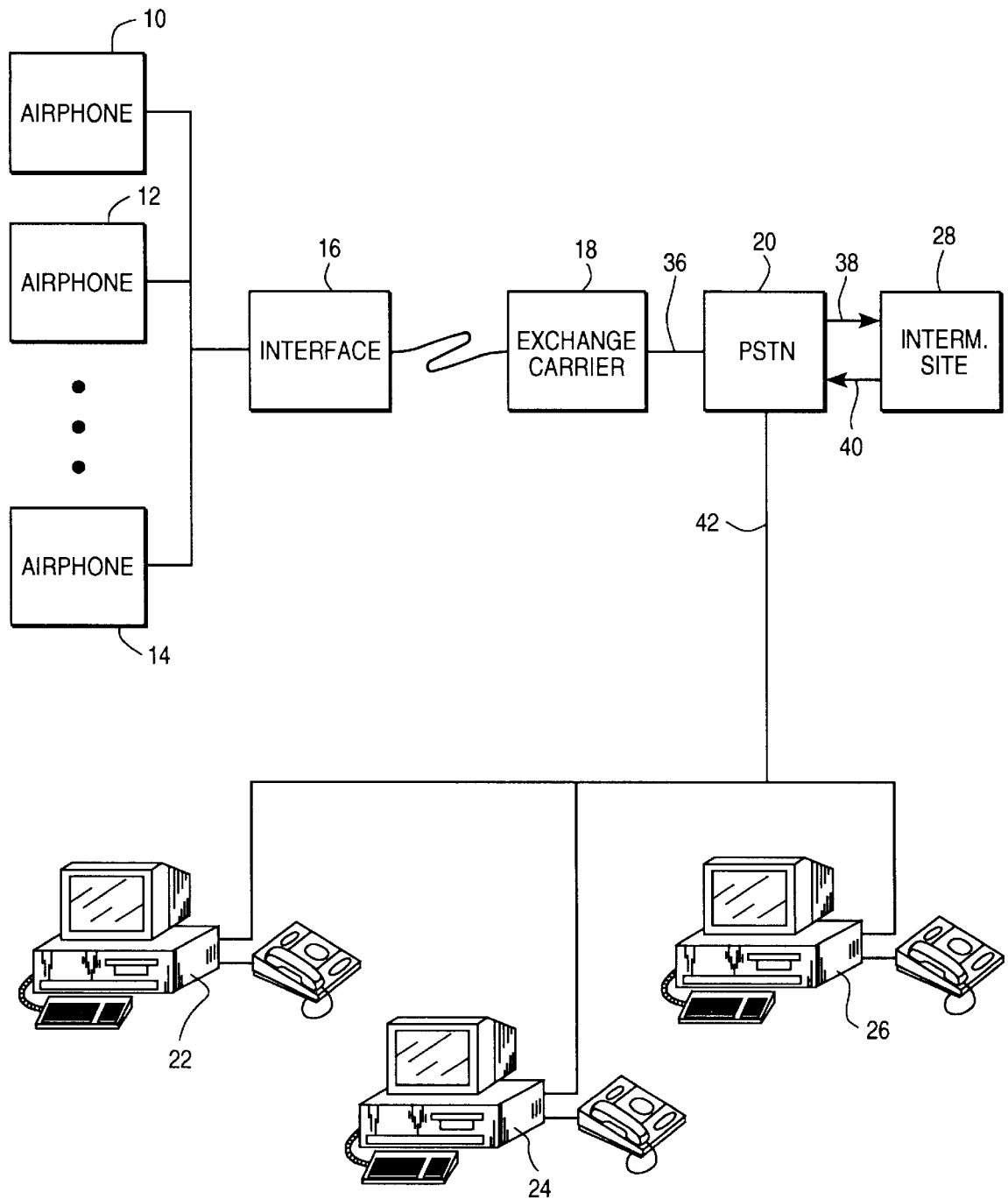
FIG_1

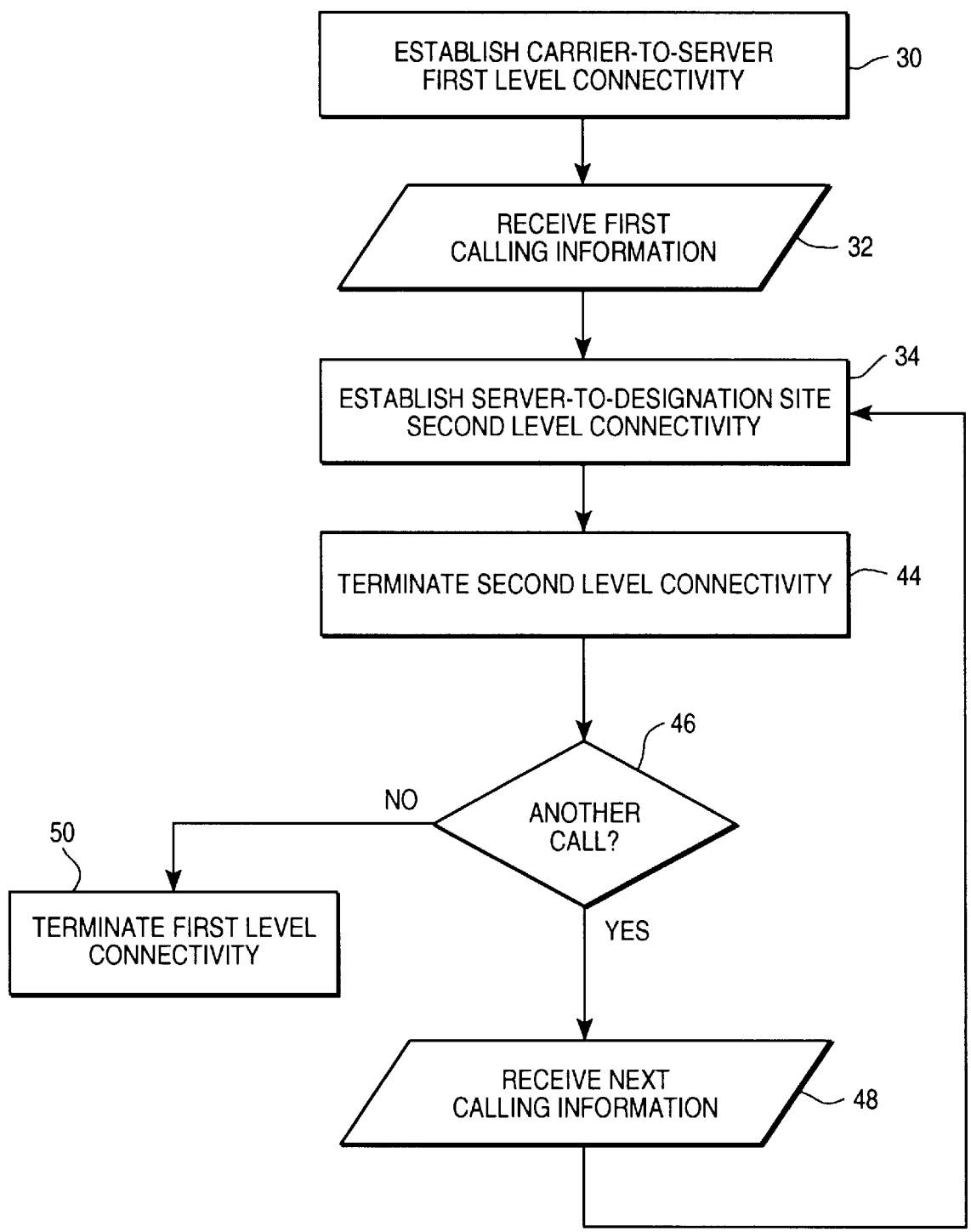
FIG_2

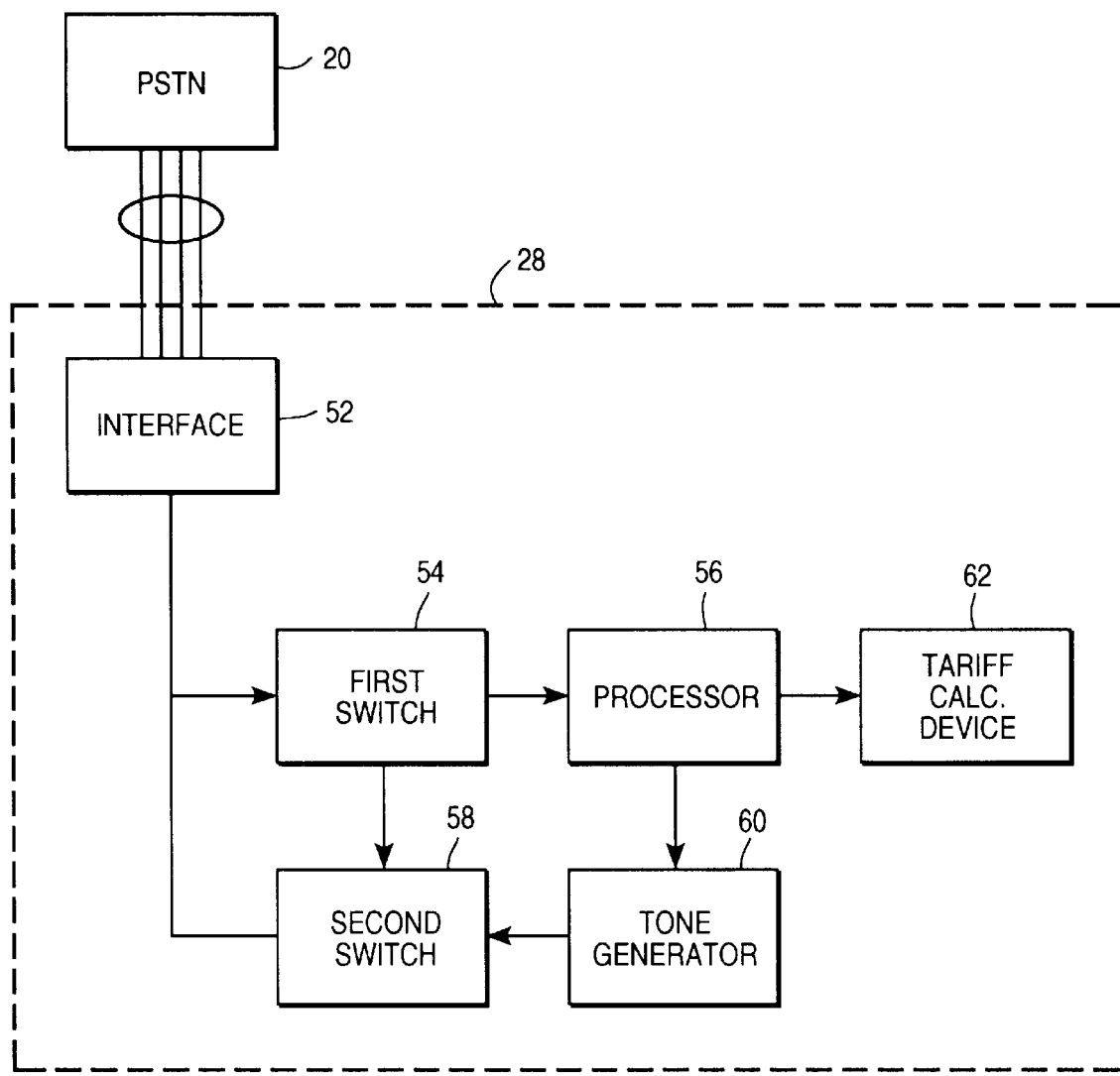
FIG_3

METHOD AND APPARATUS FOR PROCESSING A SEQUENCE OF CALLS

BACKGROUND OF THE INVENTION

The invention relates generally to communications servers and more particularly to methods and apparatus for processing a sequence of calls.

DESCRIPTION OF THE RELATED ART

There are a number of approaches available to communications service providers for charging users for access to equipment, such as trunk lines and switching circuitry. According to one approach, a communications service provider establishes a fixed monthly tariff. This is the approach adopted by many service providers of the global communications network typically referred to as the Internet. A subscriber of an Internet Service Provide (ISP) may be charged a monthly amount that does not vary with the access time required by the subscriber.

Another approach is to establish a tariff table that is primarily based upon access time. This approach may be based purely upon time or may include consideration of other factors. For example, the tariff may be greater for access to a database of chemistry-related periodicals than for access to a database of telephone numbers.

A communications service provider also may establish a hybrid of the fixed monthly tariff and the time-dependent tariff. For example, a local exchange carrier for routing telephone calls typically charges a subscriber a monthly fee for unlimited local toll-free calls, but the subscriber is charged for individual long distance calls. The tariff table for the long distance calls is dependent upon both distance and duration.

In yet another approach, the charge to a subscriber is determined on a per connection basis. There is a fixed tariff that may be considered as a flat connection fee. This connection-based approach is best suited for communications applications in which the cost of maintaining connectivity between a calling party and a called party is substantially insignificant relative to the cost of establishing the connectivity. Alternatively, the approach may be selected by a service provider for its ability to simplify billing practices while charging users based upon the levels of use.

Airphone carriers often utilize the connection-based tariff approach. An air-to-ground communications system may include a network of ground radio base stations connected to a single ground switching station. Calls directed from an airphone are routed from an aircraft to one of the base stations and then to the ground switching station. The ground switching station is connected to the public telephone switching network (PSTN), which routes the call to the called site. As an alternative, the transmission from the aircraft may be to a satellite which redirects the transmission to a satellite earth station for routing via the PSTN. In either case, establishing the connectivity is the major cost incurred by the carrier in completing the call. A significant portion of airphone calls are made from a grounded airplane. As an example of implementing a connection-based tariff structure, each call directed from an airphone or directed to an airphone may result in the airline passenger being charged $15, regardless of the length of the conversation. If the passenger places five separate calls, the total charge to the passenger will be $75. The tariff is charged even if the calls are all of short duration, as may be the case for downloading electronic mail and confirming afternoon appointments. Thus, the substantial cost of connectivity incurred by a carrier and passed on to the passenger may translate into an excessive tariff when calculated on a per minute rate. Similar circumstances may occur in other communications areas, such as a tariff structure of an ISP that utilizes the per connection approach.

What is needed is a method and apparatus which reduce the likelihood of a communications provider charging an excessive amount for a sequence of calls as a result of implementing a per connection tariff structure.

SUMMARY OF THE INVENTION

A method and apparatus of processing a sequence of calls directed to different destination sites from a single calling site include providing a call server that functions as an intermediate site for first and second connection levels from the calling site to a destination site. Connectivity of the calling site to a destination site includes routing calls utilizing a provider that implements a tariff structure on a per connection basis. That is, a call tariff is charged for each connection established by the provider. The preferred embodiment of the method includes establishing a first level connection from the provider to the intermediate site of the server, with the caller thereby incurring the call tariff. Call information regarding the destination site of the first call in the sequence is then provided to the intermediate site via the first level connection. In response to receiving the call information, a second level connection is established between the intermediate site and the destination site of the first call in the sequence. Upon termination of the first call, the steps of receiving call information at the intermediate site and establishing a second level connection are repeated to provide connectivity between the calling site and a destination site of a second call in the sequence. The process is repeated for all of the calls of the sequence. Since the first level connection is maintained throughout the sequence, the provider is required to incur the cost of establishing connectivity only once. Consequently, there is a potential savings to the calling party, depending upon the tariff structure of the intermediate site.

In the preferred embodiment, the steps of sequentially receiving the call information at the intermediate site and establishing the second level connections from the intermediate site to the different destination sites is implemented in a manner transparent to the provider. While not critical, the reception of the call information may be executed by detecting conventional call setup signals from the calling site, such as digital telecommunications signals or dual tone multifrequency (DTMF) signals. Establishing a second level connection may be a pass-through operation of the call setup signals to a public switched telephone network (PSTN) or may be a regeneration of at least some of the call setup signals at the intermediate site. In one embodiment, both the first and the second level connections utilize the PSTN.

The provider may be an airphone carrier which charges an airline passenger a fixed tariff for each call that is placed via an airphone. Alternatively, the provider may be an Internet Service Provider (ISP) which charges on a per connection basis. The calls may be voice calls or may include multimedia signals.

The intermediate site is preferably a call server having an interface connected to the PSTN. A first switching circuit establishes an off-hook state upon receiving an incoming call from the calling site via the provider, which may be an exchange carrier. A processor at the call server receives the call information in sequence while maintaining the off-hook state for the incoming call from the exchange carrier. In response to the received call information, outgoing calls to the destination sites are initiated and a second switching circuit connects the incoming call from the calling site to the outgoing calls to the destination sites.

BRIEF DESCRIPTION OF THE DRAWINGS

FIG. 1 is a schematical block diagram of a telecommunications system having an intermediate site for implementing a method of processing a sequence of calls in accordance with one embodiment of the invention.

FIG. 2 is a process flow of steps for executing the method of handling the sequence of calls utilizing the system of FIG. 1.

FIG. 3 is a schematical block diagram of the intermediate site of FIG. 1.

DETAILED DESCRIPTION

With reference to FIG. 1, in one embodiment, the method is used with a conventional air-to-ground communications system that includes a number of airphones 10, 12 and 14 connected to an interface 16. The airphones may be limited to voice communications, and/or may be capable of transmitting video, user data and other multimedia information. The airphones are located in the passenger area of an airplane, while the interface 16 is positioned on the plane to accommodate wireless transmissions to an exchange carrier 18. The interface includes a number of transceivers for transmitting and receiving radio frequency signals to and from a base station of the exchanger carrier 18. The number of transceivers determines the maximum number of calls that can be conducted simultaneously. For example, each transceiver may be dedicated to a single call, so that resource capacity of the interface is reached when there is a one-to-one correspondence between the number of transceivers and the number of calls being conducted.

The equipment of the exchange carrier 18 is not critical to the invention. The equipment may include a number of ground stations connected to a single ground switching station which is coupled to a public switched telephone network (PSTN) 20. Alternatively or additionally, the exchange carrier 18 may include communications satellites which transmit and receive call information between the transceivers of the interface 16 and a ground switching station.

A call initiated from the airphone 10 may be directly linked to a called destination site 22, 24 and 26 via the interface 16, the exchange carrier 18, and the PSTN 20. This direct link is conventional in air-to-ground communications. The calling party is charged by the exchange carrier 18 according to an established tariff structure. Often, the tariff structure for the air-to-ground communications system is connection based. That is, each call initiated or received by a caller results in the airline passenger being charged a flat fee, which will be designated herein as "x." For example, x=$15. A sequence of calls that includes one call to each of the destination sites 22, 24 and 26 results in the passenger being charged 3x. The value of x is partially determined by the cost of establishing connectivity between the interface 16 and the equipment of the exchange carrier 18 and the cost of establishing connectivity from the exchange carrier to the appropriate destination site via the PSTN 20. Consequently, reducing the number of required separate connections to and from the exchange carrier in order to complete a sequence of calls from a single calling site reduces the connectivity costs incurred by the exchange carrier. Moreover, when the method that will be described below is used as the means for reducing the number of required carrier connections to complete the call sequence, there may be a substantial savings to the calling party.

According to the invention, the first connection from the equipment of the exchange carrier 18 is to an intermediate site 28, which may be referred to as a server. The server is "intermediate" in the sense that it is not a destination site for connection of a calling party to a called party, but is instead an additional site through which the calling information is channeled. FIG. 1 illustrates the preferred embodiment, in which the intermediate site is connected to the exchange carrier 18 via third party equipment, such as the PSTN 20. However, if the exchange carrier is to be the primary beneficiary of the server capability, the intermediate site may be located between the conventional equipment of the exchange carrier 18 and the PSTN 20.

When a passenger located at the airphone 10 intends to complete a sequence of calls to different destination sites 22, 24 and 26, the passenger may initiate a "preliminary" call to the server 28. This results in the passenger being charged x amount for the call, since the equipment of the exchange carrier 18 must establish connectivity between the carrier and the server. This first level connectivity between the carrier and the server is shown at step 30 of FIG. 2. The process for establishing the first level connectivity is identical to the conventional process of establishing direct connectivity from the exchange carrier to one of the destination sites.

Call information relating to the first call in the sequence is then provided by the passenger at airphone 10 and is received at the server 28, as shown by step 32 in FIG. 2. In its simplest form, the call information is a telephone number of the desired destination site and is received at the server by means of dual tone multifrequency (DTMF) signals or conventional digital communications signals. The server utilizes the calling information to initiate a second level connectivity at step 34. The second level connectivity is from the server 28 to the destination site identified in the calling information. In FIG. 1, the first level connection is represented by communications lines 36 and 38, while the second level connection is identified by communications lines 40 and 42.

Preferably, steps 32 and 34 of receiving the calling information and establishing the second level connectivity are executed in a manner transparent to the exchange carrier 18. Consequently, no additional expenses are incurred by the carrier.

The step 34 of establishing the second level connectivity can be initiated at the server 28 by generating DTMF tones or digital signals that are utilized by the PSTN 20 to connect the appropriate destination site 22, 24 and 26. Alternatively, DTMF or digital signals generated by the passenger at the airphone 10 may be passed through the server 28 to the PSTN. In this alternative embodiment, both the exchange carrier 18 and the server 28 function as conduits for the DTMF or digital signals for initiating the first call of the sequence.

Following completion of the first call in the sequence, the second level connectivity represented by communications lines 40 and 42 is terminated. This is shown at step 44 in FIG. 2. However, the first level connectivity is maintained. In decision step 46, the issue is whether another call to one of the destination sites 22, 24 and 26 is to be initiated still utilizing the first level connectivity. There are a number of available embodiments to execute this decision step. For example, the server 28 may transmit voice prompts to the caller at the airphone 10 via the first level connection. Thus, when the user signals termination of the first call to a destination site, a voice prompt from the server 28 may be triggered to request an indication of whether a second call is to be made by the passenger. In another embodiment, the passenger has prior knowledge of a termination-and-reinitiate signaling process that may use DTMF signals. For example, one key of a telephone keypad may be designated as the key to press to indicate termination of both of the first and second level connections, and a different key may be designated as the key to press to indicate that a subsequent call is to be made. In a third embodiment, the first level connection is terminated after passage of a timeout threshold, during which time a dial tone is provided by the call server (e.g., 30 seconds). The passenger then has the time threshold to initiate a subsequent call. A difficulty with this embodiment is that airphones are often shared by different passengers, so that there is a concern that a second passenger will initiate a call prior to passage of the timeout threshold of the first level connection established at step 30 for a first passenger. Therefore, the voice prompt embodiment is considered to be the preferred embodiment.

If at decision step 46 it is determined that the passenger wishes to initiate a second call to a destination site 22, 24 and 26, the call information is input by the passenger at airphone 10 and received at the server 28, as shown at step 48 in FIG. 2. Execution of step 48 may be identical to the execution of the step 32 of receiving the first calling information. For example, DTMF signals from the airphone are transmitted through the first level connection to the server which acts as a conduit for relaying the DTMF signals to the PSTN 20. Alternatively, the required DTMF signals may be generated at the server in response to receiving the calling information at step 48. The process flow then returns to step 34 in order to establish a second level connectivity to the new destination site.

With completion of the second call in the sequence of calls, the second level connection is terminated at step 44 and the process returns to the decision step 46. This loop is continued until the final call in the sequence is completed. At that time, the decision at step 46 will be that there is no further call to be initiated. Consequently, the first level connectivity is terminated at step 50.

Exemplary components of server 28 of FIG. 1 are shown in FIG. 3. An interface 52 is connected to the PSTN 20 by means of communication lines. For example, the interface may include conventional line cards and the communication lines may be leased analog or digital trunk lines. A first switch 54 is an input device that establishes an off-hook state upon receiving an incoming call. The condition of the first switch 54 determines whether the first level of connectivity to the exchange carrier 18 of FIG. 1 is established. That is, when the first switch is in an off-hook state, connectivity between the server 28 and the exchange carrier 18 is provided via the communication lines 36 and 38 of FIG. 1. One output from the first switch is an input to a processor 56 that controls operations of the server 28. Another output of the first switch 54 is an input to a second switch 58. The second switch also has on-hook and off-hook states. The state of the second switch determines whether a second level connection is established from the server 28 to one of the destination sites 22, 24 and 26. Consequently, when both of the switches 54 and 58 are off-hook, the airphone 10 is in communication with one of the destination sites.

The server 28 may also include a tone generator 60 that is used in the embodiment in which DTMF signals are generated or regenerated at the server. A tone generator is not critical, since the DTMF signals from the airphone 10 may be passed through the first and second switches 54 and 58 to the PSTN 20. As will be readily understood by persons skilled in the art, digital signaling methods are utilized in a digital telecommunications network, such as an Integrated Services Digital Network (ISDN). Digital signals may be generated at the user's location or at the server. Of course, one of the two levels of connectivity may be an analog or digital connection using DTMF signals, while the other level is a digital connection using conventional digital signals.

The server 28 also includes a tariff calculation device 62. This device determines the cost to the passenger for use of the server 28 in the manner described above. The tariff structure contained within the device 62 may be connection based or time based. For example, there may be a connection fee of $1 or a per minute charge that is either fixed or determined by the distance to the destination site, i.e., a long distance charge. Again referring to the flat connection tariff of the exchange carrier 18 by the symbol "x," the server 28 is cost efficient only if Ax>x+B, where A is the number of calls in a sequence utilizing the method of FIG. 2 and B is the total tariff charged for the use of the server 28 for the calls. Thus, if the tariff structure of the server is connection based and the connection fee is "y," the use of the server is cost efficient only if Ax>x+Ay. Cost efficiency for a time based tariff by the server may be considered with B=wz, where w is the total number of minutes for the calls and z is the per minute charge. Then, the use of the server is cost efficient only if Ax>x+wz.

While the invention has been described and illustrated as being used with an air-to-ground communications system, this is not critical. Rather than an exchange carrier, the provider that has a tariff structure based upon connections may be an Internet Service Provider (ISP). For example, telephone calls initiated using Internet telecommunications software may be made in sequence using the method of FIG. 2 and using an intermediate server that maintains the first level connectivity during the sequence of calls. In an alternative embodiment, the ISP may be used as the server 28. For example, the exchange carrier 18 of FIG. 1 may be connected to an ISP via the first connection level, with the second connection level being from the ISP to one of the remote sites 22, 24 and 26.

We claim:

1. A method of processing a sequence of calls directed to destination sites from a single calling site, wherein routing said calls includes utilizing a provider at a tariff determined on a per connection basis, said method comprising steps of:
   (a) identifying a called site that is specified by a caller in a first user generated call request;
   (b) as a response to determining that an intermediate site is said called site specified in said first user generated call request, establishing a first level connection such that said provider is connected to said intermediate site;
   (c) receiving call information at said intermediate site from said calling site via said first level connection, said call information being a second user generated call request relating to one of said calls in said sequence;
   (d) based upon said call information, establishing a second level connection such that said intermediate site is connected to one of said destination sites, thereby providing connectivity between said calling site and said destination site; and
   (e) repeating steps (c) and (d) for each of said calls in said sequence while maintaining said first level connection.

2. The method of claim 1 wherein said step (e) includes repeating said steps (c) and (d) in a manner transparent to said provider.

3. The method of claim 1 wherein each of said steps of establishing said first and second level connections includes utilizing a public switched telephone network (PSTN).

4. The method of claim 1 wherein said step c of receiving said call information includes receiving one of dual tone multifrequency (DTMF) signals or digital call setup signals from said calling site.

5. The method of claim 4 wherein said step (d) of establishing said second level connection includes passing through said one of DTMF signals or digital call setup signals to a public switched telephone network (PSTN).

6. The method of claim 4 wherein said step (d) of establishing said second level connection includes regenerating said one of DTMF signals or digital call setup signals at said intermediate site.

7. The method of claim 1 wherein said step (b) of establishing said first level connection is a step of providing connectivity between an airphone and a server, said provider being an exchange carrier of air-to-ground telecommunications.

8. The method of claim 1 wherein said step (b) of establishing said first level connection is a step of providing connectivity between said calling site and an Internet Service Provider (ISP).

9. The method of claim 1 further comprising a step of transmitting multi-media signals from said calling site to said destination site via said first and second level connections.

10. The method of claim 1 further comprising the step (f) of calculating billing information for said second level connection under a billing scheme that is independent from a billing scheme that is utilized in calculating billing information for said first level connection, said step (e) including repeating step (f) for each of said calls in said sequence.

11. A method of completing a sequence of calls to more than one destination site via a provider which has an established tariff for each call connection initiated by said provider, said method comprising steps of:

directing a preliminary call to an intermediate server via said provider, thereby establishing a first level connection between said provider and said intermediate server such that said established tariff is incurred;

transmitting first call information to said intermediate server via said first level connection such that said intermediate server is enabled to establish a second level connection between said intermediate server and a first destination site, said first call information relating to a first call of said sequence;

terminating said first call in a manner transparent to said provider, while maintaining said first level connection;

transmitting second call information to said intermediate server via said first level connection in a manner transparent to said provider such that said intermediate server is enabled to establish a second level connection between said intermediate server and a second destination site, said second call information relating to a second call of said sequence; and conducting said second level connections under a billing scheme that is independent of said established tariff incurred for said first level connection.

12. The method of claim 11 wherein said step of directing said preliminary call includes initiating said preliminary call from a telephony device on an aircraft and includes utilizing an exchange carrier, said exchange carrier being said provider.

13. The method of claim 11 wherein each of said steps of transmitting said first call information and said second call information includes utilizing call setup signals to identify the appropriate destination site.

14. The method of claim 11 further comprising a step of transmitting multimedia data to said destination sites via said first and second level connections.

15. The method of claim 11 wherein said step of directing said preliminary call includes utilizing an Internet Service Provider (ISP) as said provider.

16. A call server comprising:

an interface connected to a public switched telephone network;

first switching means for establishing an off-hook state upon receiving an incoming call from an exchange carrier;

processor means for receiving call information relating to more than one outgoing call to be initiated while said off-hook state is maintained for said incoming call;

means, connected to said processor means and responsive to said processor means, for sequentially initiating said outgoing calls while said off-hook state is maintained;

second switching means, connected to first switching means, for sequentially connecting said incoming call to said outgoing calls; and means for generating billing information for said outgoing calls independently of generation of billing information for said incoming call by a device associated with said exchange carrier.

17. The call server of claim 16 wherein said means for sequentially initiating said outgoing calls includes a tone generator of dual tone multifrequency (DTMF) signals.

18. The call server of claim 16 wherein said means for sequentially initiating said outgoing calls includes a generator of digital telecommunications setup signals.

19. The call server of claim 16 wherein said means for sequentially initiating said outgoing calls is connected to said interface for directing said outgoing calls via said public switched telephone network.

* * * * *